J. HOLLAND.
Fountain-Pen.
No. 211,575. Patented Jan. 21, 1879.
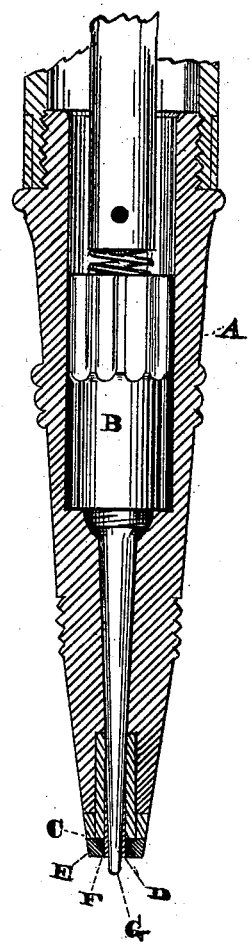
Attest
Henry Millward
E. D. Grafton.
Inventor
John Holland
By Geo. J. Murray
Attorney

UNITED STATES PATENT OFFICE.

JOHN HOLLAND, OF CINCINNATI, OHIO.

IMPROVEMENT IN FOUNTAIN-PENS.

Specification forming part of Letters Patent No. 211,575, dated January 21, 1879; application filed November 18, 1878.

*To all whom it may concern:*

Be it known that I, JOHN HOLLAND, of Cincinnati, in the State of Ohio, have invented a new and useful Improvement in Writing-Points for Fountain-Pens, of which the following is a specification:

The object of this invention is to provide a means of securely attaching iridium writing-points to fountain-pens, whether such points are constructed of grains of iridosmine, as in my Patent No. 202,655, of April 23, 1878, or of a single piece of the same, as described in my application now pending before the Patent Office. In both of these the iridium is secured to its place around a soft-metal core, which core, after the point was soldered, was drilled out to form the ink-duct. By this process, as the drills required for the purpose are very small, a great many of them are broken, and the point, after the core is removed, being only supported and held to its place by the transverse joint of solder, is easily broken off. These defects I remedy by using as a core, instead of the wire, a light tube of platinum, which, when finished, firmly secures the point in place.

The accompanying drawing is an axial section of a writing-point constructed according to my invention. The view is greatly enlarged to more clearly show the parts.

A is the rubber point-holder, fitted with valve B, valve-stem G, and shouldered tube or point-holder C. D is the tube of platinum; E, the iridium point, and F the gold or other solder which fills a conical bore in the point E, and holds it firmly to its tube D.

The parts A, B, G, and C are the same as shown in my former application, and need not be particularly described here.

The mode of constructing my point is as follows: Grains of iridosmine are soldered to a plate of brass, and drilled the same as described in my former application, except that the perforation is conical. Drilling them thus enables me to use a stronger drill, and when the points are placed in position around a parallel core the solder F, filling the cavity, furnishes a support to the point E. The thin tube D is inserted in the shouldered tube C, the iridium point E slipped over it, with the largest opening inside, and the parts soldered together. Under the heat of the blow-pipe the solder will flow into the cavity F, and firmly bind the point E to its tube. The tube C is now secured in holder A, and by a conical reamer the ink-duct is reamed out smooth and of a conical shape, so that the valve-stem G may close the flow of ink at the point instead of above, and thus effectually prevent leakage when the pen is not in use. The point is then dressed down to the proper size, thus completing it for use.

When grains of iridosmine are used to form the point, the only change necessary is to substitute the platinum tube for the solid core.

It will be seen that when the single piece of iridium is used, as herein shown, even without the platinum tube, the re-enforce F, of solder, would firmly hold it to its place.

I claim—

1. A writing-point for fountain-pens, consisting of a single piece of iridosmine, having a conical cavity to receive solder, for the purpose of securing said point firmly in place, constructed substantially as described, whether said point is used with or without a platinum tube.

2. In a fountain-pen, the combination, substantially as specified, of the conically-bored point E with tubes C and D, for the purpose specified.

JOHN HOLLAND.

Witnesses:
 GEO. W. BLACK,
 HENRY MILLWARD.